Aug. 7, 1928. 1,680,211
J. F. FARMER
ANTIGLARE MOTOR VEHICLE LAMP
Filed Nov. 30, 1925   2 Sheets-Sheet 1

INVENTOR:
John F. Farmer,
BY E. T. Silvius
ATTORNEY.

Aug. 7, 1928.

J. F. FARMER 1,680,211

ANTIGLARE MOTOR VEHICLE LAMP

Filed Nov. 30, 1925       2 Sheets-Sheet 2

INVENTOR:
John F. Farmer,
BY E. T. Silvius,
ATTORNEY.

Patented Aug. 7, 1928.

1,680,211

UNITED STATES PATENT OFFICE.

JOHN F. FARMER, OF INDIANAPOLIS, INDIANA.

ANTIGLARE MOTOR-VEHICLE LAMP.

Application filed November 30, 1925. Serial No. 72,372.

This invention relates generally to motor-vehicle lamps of the class or type adapted for lighting roadways at night time, the invention having reference more particularly to an anti-glare electric lamp that is designed to sufficiently illuminate a roadway without projecting dazzling light beams into the eyes of the drivers of motor-vehicles coming from an opposite direction.

An object of the invention is to provide an improved lamp which shall be of such construction as to be adapted to provide a driving light and to be used as a spot-light, and also a side light to illuminate the roadway ahead and along the side of the road that is being used, without lighting the opposite side of the road on which other vehicles may be approaching.

Another object is to provide a combination motor-vehicle lamp of improved construction which shall be adapted to be used as a plain headlight, either with or without a dimmer, to light the roadway ahead or to be used to illuminate only the side of the road that is being used at the time.

A further object is to provide an improved spot-light reflector which shall be of such construction as to be adapted for projecting a light beam straight ahead and also relatively less strong light rays on one side of the spot-light beam, and a casing for the reflector adapted to constitute a shield to prevent an opposing driver from seeing the electric lamp required for the purpose.

A still further object is to provide a combination lamp which shall have a main reflector and lamp and an improved side reflector provided with an adjustable lamp whereby to obtain various results in operation and maintenance, and which shall be durable and economical in use.

With the above-mentioned and other objects in view, the invention consists mainly in a novel reflex-action reflector and its arrangement relatively to a motor-vehicle to project light upon one side only of a roadway being traversed, the invention including a novel casing for the reflector, and a combination electric lamp having a main reflector and lamp and a novel side reflector and lamp adapted for projecting strong beams and also strong side rays on one side of the beams; and the invention consists also further in the novel parts and combinations and arrangements of parts as hereinafter particularly described and further definitely claimed.

Figure 1:
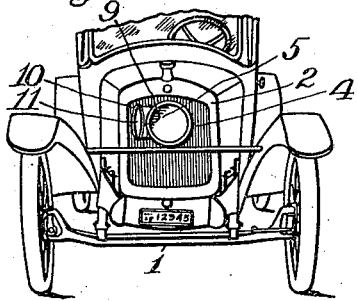
Figure 2:
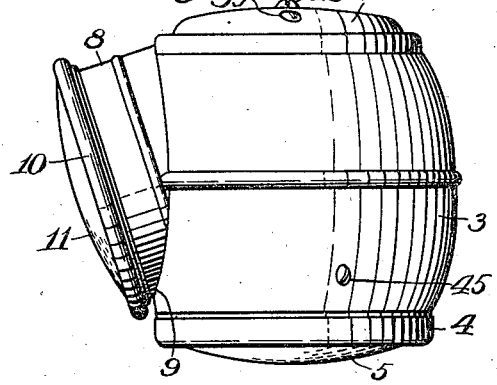
Figure 3:
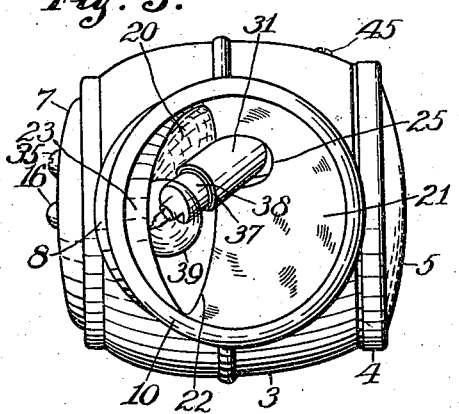
Figure 4:
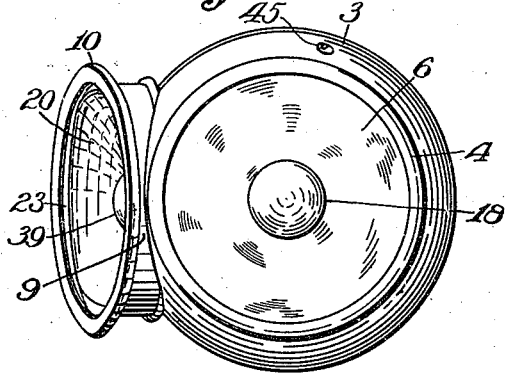
Figure 5:
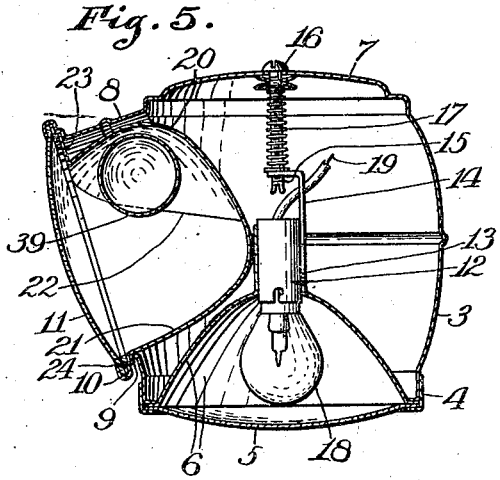
Figure 10:
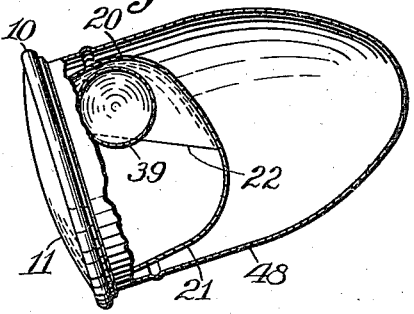
Figure 6:
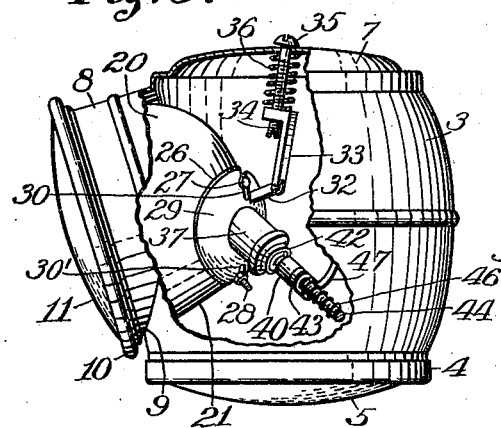
Figure 7:
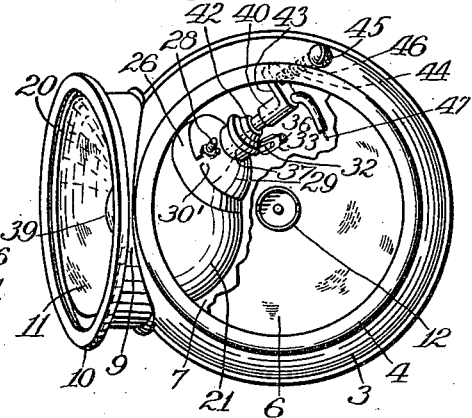
Figure 8:
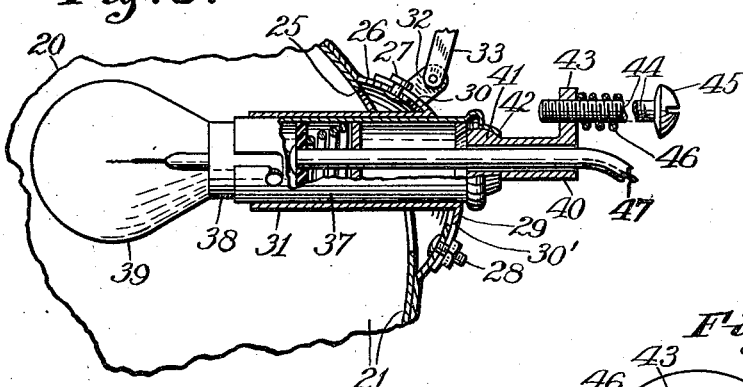
Figure 9:
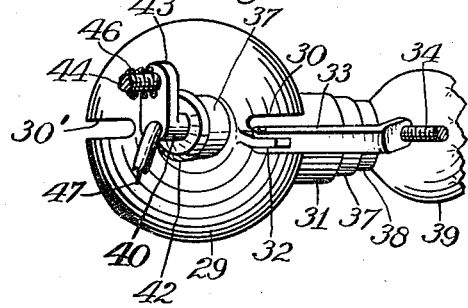

Referring to the drawings,—Figure 1 is a front perspective view of an automobile having one of the improved lamps arranged thereon as sufficient to an understanding of the invention; Fig. 2 is a top plan of the combination lamp; Fig. 3 is a side elevation in which the covering glass of the side lamp is omitted; Fig. 4 is a front elevation of the lamp minus the main light lens and the side lamp glass cover; Fig. 5 is a horizontal section of the combination lamp; Fig. 6 is a top plan of the combination lamp partially broken away to disclose internal construction, the main reflector and lamp being omitted; Fig. 7 is a front elevation partially broken away to disclose internal structure, the main lamp lens being omitted; Fig. 8 is a sectional detail of the adjustable mounting of the side light lamp on an enlarged scale; Fig. 9 is a perspective view of an assembly of the adjusting mounting of the side lamp; and Fig. 10 is a sectional plan showing the improved spot-light reflector in a modified form of casing which is permissible when a main light is not desired or necessary.

Similar reference characters in the different figures of the drawings indicate corresponding elements or features of construction herein referred to in detail.

The improved lamp is illustrated as being adapted for use in accordance with the present practice of driving motor-vehicles on what is commonly known as the right-hand side of roads, and obviously the lamp may be constructed reversely or may be used in inverted arrangement to be adapted for use in driving on the left-hand side if required; and if desired, any number of the lamps may be mounted in such positions as may be desired on each motor-vehicle.

In the drawings, for descriptive purposes, the forward portion of an automobile is shown, of which familiar parts are the forward axle 1 and water-cooling radiator 2, the improved lamp being arranged forward of the radiator, any suitable means for directly supporting the lamp being permissible.

The improved combination lamp has a casing which comprises a main portion 3 of suitable design and provided on its normally front end with a frame or retaining ring 4 which secures a lens or glass front 5 to the front end to which a reflector 6 is connected, the main portion having a back end member 7 connected to its normally rearward end. The casing has also a side frame comprising a broad portion 8 and a relatively narrow portion 9, the portion 8 being arranged in proximity to the back end member 7 and the narrow portion adjacent to the front end of the main portion. The side frame preferably is circular and its front edge is provided with a suitable retaining ring 10 which holds a window glass 11 in place on the frame. The window glass preferably is uniform in thickness and dished so as to be bulged outward. The central portion of the reflector 6 supports a lamp socket 12 which preferably is adjustable longitudinally in a tubular guide 13 fixed on the reflector and provided with a yoke 14 having a screw-threaded controlling rod 15 connected thereto, the rod extending through the center of the back member 7 and having a head 16 thereon in contact with the member for drawing the socket backward, a coil spring 17 being arranged on the rod between the yoke and the back member to yieldingly push the socket forward. An electric lamp 18 is connected with the socket and supplied with current through a circuit 19 as is customary, and the circuit may be suitably extended through the lamp casing to any suitable electrical source.

The improved spot-light or side reflector comprises a parabolic reflector portion 20 and a preferably larger reflex portion 21 connected with the front edge 22 of the parabola, there being no visible line of demarkation, however, between the contours of the two portions, the curvature of the reflex portion merging into the regular curvature of the parabolic. The curvature of the reflex portion 21 is not uniform in degree but has concave portions of different radii presented generally towards the concave surfaces of the parabolic portion. The reflector is mainly within the main portion of the casing so as to have compact structure, but the focal center of the parabolic portion is arranged adjacent to the broad portion 8 of the side frame, and a portion of the edge of the reflector which is in the side frame has a flange 23 thereon for securing the reflector to the side frame, the reflex portion having a narrow flange 24 for securing the remaining portions of the reflector to the side frame. The reflector has an aperture 25 therein which is wholly or mainly in the reflex portion 21 and above the level of the guide 13 when the latter is included in the structure, to receive an electric lamp holder. When the retaining ring or frame 10 is removed the reflector may be withdrawn from the casing.

A novel adjustable lamp support is provided which comprises a bearing ring 26 which is fixed to the convex side of the reflector portion 21 so as to extend about the aperture, the face of the ring being globular and having suitable guides 27 and 28 on opposite portions thereof, one of the guides preferably being of bolt form. A holder base 29 is provided which has a concave back face arranged on the bearing ring 26 and corresponds thereto in curvature, and it has slots 30 and 30' in opposite edge portions thereof that receive the guides 27 and 28. The base 29 has a tubular guide 31 fixed thereto that extends freely through the aperture 25 which permits the guide to be inclined to different degrees. The base has a lug 32 thereon to which a yoke 33 is pivoted, and a screw-threaded controlling rod 34 is connected to the yoke and extends through the back member 7 above the center of the member and has a head 35 thereon engaging the outer side of the member, whereby to draw the base 29 in one direction, a spring 36 being arranged under compression on the rod between the yoke and the member 7 of the casing to push the base in the opposite direction. A lamp socket 37 of suitable length is arranged in the guide 31 and extends therethrough and directly supports the shank or plug 38 of an electric lamp 39, the lamp normally being supported closely opposite to the focal center of the parabolic portion 20 of the reflector. A hollow yoke stem 40 is provided which has a ball segment head 41 arranged in a cup 42 with which the outer end of the socket member 37 is provided, so as to constitute a universal coupling, the yoke having a lateral lug 43 to which a screw-threaded controlling rod 44 is connected, the rod extending upwardly at an inclination and through the upper forward portion of the main casing, the rod having a head 45 on its end that bears against the outer side of the casing, whereby to adjustably move the lamp in one direction, a coil spring 46 being arranged on the rod under compression between the plug and the inner side of the casing to move the lamp in the opposite direction. The lamp is supplied as usual with current through a conductor 47 extending through the hollow yoke 40 and having suitable connection with the lamp plug; and the conductor is to be extended out through the casing to a source of electrical current.

In some cases the requisite light on a road may be supplied by a single lamp, in which case a casing 48 of modified form is provided of sufficient capacity to house the side reflector and the adjustable lamp as above described, the housing having the retaining ring or frame 10 and the window glass 11, no main reflector and lamp being desired; and the casing 48 is to be so mounted on a motor-vehicle as to maintain the parabolic reflector portion and the reflex portion in an angular position corresponding to the position occupied in a combination lamp and relatively to the line of movement of a motor-vehicle, to project a light beam forward and also lateral rays on one side of the beam, for the purposes above explained.

In practical use the main reflector 6 and the lamp therein may be commonly used to light the road and may be switched off or dimmed upon the approach of an opposing driver. The side lamp may be used at will so as to cause a spot-light beam ahead on the road, the side lamp 39 being effectively shielded by the reflex portion 21 of the side reflector so as to be invisible to approaching drivers. The parabolic reflector portion 20 reflects light from the lamp onto the reflex portion 21, to be turned back onto the parabolic portion, and also projects a spot-light beam past the narrow forward portion 9 of the side frame and directly forward on the road being traversed. The beam may be projected forward parallel to the line of travel of the motor-vehicle or slightly divergent therefrom, as may be predetermined and depending upon the relative positions of the parabolic reflector portion and the lamp therein as may be desired. The light of the beam from the lamp 39 spreads slightly and merges with the light reflected from the main lamp 18, due to natural causes and various well-known atmospheric conditions, usually providing sufficient driving light on the road without the main light. As the light from the side lamp is reflected forwardly the parabolic portion of the side reflector reflects light rays laterally onto the side of the road and some of the light rays are turned back by the reflex portion 21 and merge with forwardly and laterally projected rays, resulting in the projection of a strong and brilliant light forwardly by the parabolic portion of the side reflector, whereby the roadway is thoroughly well illuminated without interference with persons using the opposite side of the road. When necessary or desirable to adjust the side lamp 39 the head 45 is suitably turned to adjust the lamp in its reflector, and when a lamp must be renewed the head 35 is turned so as to cause the burnt-out lamp to be swung away from the parabolic portion of the reflector, which permits the lamp to be removed from the lamp socket through the front of the side lamp on removal of the window glass 11, after which a new lamp may be connected to the socket and swung back to its proper position by means of the controlling rod 34 and its head 35. The lamp may be variously adjusted if desired by manipulation of either one or both of the heads 35 and 45 of the controlling rods.

What is claimed as new is:

1. An anti-glare motor-vehicle lamp including a casing comprising a main portion and a forwardly-projecting side frame, a side reflector secured in the side frame of the casing and having an aperture therein, the reflector comprising a parabolic portion facing forwardly and a reflexing portion facing towards the parabolic portion, a lamp holder base adjustably supported on the back of the reflector and having a tubular guide extending through said aperture, and a lamp socket supported to be longitudinally adjusted in the guide for holding a lamp in the parabolic portion of the reflector.

2. In an anti-glare motor-vehicle lamp, the combination, with a casing comprising a main portion having a back end and a relatively angular side frame, of a combination parabolic and reflex reflector arranged in said main portion and side frame and having an aperture in an upper portion thereof, a tubular guide extending through said aperture and having a base adjustably supported on the back of the reflector to tilt the guide, a controlling rod having connection with said base and extending through said back end, a lamp socket longitudinally guided in said guide, and a controlling rod having connection with said socket and extending through said main portion.

In testimony whereof, I affix my signature on the 24th day of November, 1925.

JOHN F. FARMER.